(12) United States Patent  
Quek et al.

(10) Patent No.: US 8,892,141 B2
(45) Date of Patent: Nov. 18, 2014

(54) BASE STATIONS, CELLULAR COMMUNICATION SYSTEMS, METHODS FOR CONTROLLING A BASE STATION, AND METHODS FOR CONTROLLING A CELLULAR COMMUNICATION SYSTEM

(75) Inventors: Quee Seng Tony Quek, Singapore (SG); Zhongding Lei, Singapore (SG); Sai Ho Wong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 248 days.

(21) Appl. No.: 13/265,822

(22) PCT Filed: Apr. 26, 2010

(86) PCT No.: PCT/SG2010/000166
§ 371 (c)(1),
(2), (4) Date: Jan. 4, 2012

(87) PCT Pub. No.: WO2010/123464
PCT Pub. Date: Oct. 28, 2010

(65) Prior Publication Data
US 2012/0100878 A1    Apr. 26, 2012

(30) Foreign Application Priority Data

Apr. 24, 2009 (SG) .................................. 200902831

(51) Int. Cl.
*H04W 24/00* (2009.01)
*H04W 48/16* (2009.01)
*H04W 88/08* (2009.01)
*H04W 92/20* (2009.01)

(52) U.S. Cl.
CPC .............. *H04W 48/16* (2013.01); *H04W 88/08* (2013.01); *H04W 92/20* (2013.01)
USPC .......................................... 455/507; 370/332

(58) Field of Classification Search
CPC ..... H04W 36/18; H04W 36/30; H04W 88/00; H04L 29/08108

USPC .......................................................... 455/507
See application file for complete search history.

(56) References Cited

U.S. PATENT DOCUMENTS 5,574,968 A * 11/1996 Olds et al. ...................... 455/428
5,581,596 A * 12/1996 Hogan ........................ 455/435.1

(Continued)

FOREIGN PATENT DOCUMENTS

CN         1750711         3/2006
CN        101006656        7/2007

(Continued)

OTHER PUBLICATIONS

3GPP, Requirements for Further Advancements for Evolved Universal Terrestrial Radio Access (E-UTRA), in TR 36.913 V8.0.0, Jun. 2008.

(Continued)

*Primary Examiner* — Hai V Nguyen
(74) *Attorney, Agent, or Firm* — K. David Crockett, Esq.; Niky Economy Syrengelas, Esq.; Crockett & Crockett, PC

(57) ABSTRACT

In various embodiments, a base station may be provided. The base station may include a first determiner configured to determine whether user data has been received from a radio communication terminal by the base station; a second determiner configured to determine whether information from which it may be determined that the user data has been received from the radio communication terminal by another base station has been received from the other base station; and a transmitter configured to transmit to the radio communication terminal information indicating whether at least one of the base station and the other base station has received the user data based on at least one of the result of the determination of the first determiner and the result of the determination of the second determiner.

14 Claims, 11 Drawing Sheets

(56) References Cited

U.S. PATENT DOCUMENTS

| | | | |
|---|---|---|---|
| 5,909,469 A * | 6/1999 | Frodigh et al. | 375/302 |
| 6,108,547 A * | 8/2000 | Yamashita et al. | 455/442 |
| 6,359,869 B1 * | 3/2002 | Sonetaka | 370/337 |
| 6,370,379 B1 * | 4/2002 | Rugaard | 455/435.1 |
| 6,839,559 B2 * | 1/2005 | Ikeda et al. | 455/442 |
| 6,965,568 B1 | 11/2005 | Larsen | |
| 6,985,736 B1 * | 1/2006 | Aalto | 455/447 |
| 7,185,256 B2 * | 2/2007 | Miki et al. | 714/751 |
| 7,242,942 B2 * | 7/2007 | Kunihiro | 455/444 |
| 7,269,420 B2 * | 9/2007 | Heo et al. | 455/436 |
| 7,292,873 B2 * | 11/2007 | Wei et al. | 455/522 |
| 7,496,075 B2 * | 2/2009 | Kwak et al. | 370/335 |
| 7,554,985 B2 * | 6/2009 | Ihm et al. | 370/394 |
| 7,574,645 B2 * | 8/2009 | Pan et al. | 714/748 |
| 7,769,351 B2 * | 8/2010 | Kwak et al. | 455/69 |
| 7,821,996 B2 * | 10/2010 | Cai et al. | 370/331 |
| 7,899,435 B2 * | 3/2011 | Yano | 455/343.3 |
| 8,040,848 B2 * | 10/2011 | Uemura et al. | 370/329 |
| 8,050,222 B2 * | 11/2011 | Maeda et al. | 370/329 |
| 8,081,999 B2 * | 12/2011 | Vaittinen et al. | 455/525 |
| 8,204,449 B2 * | 6/2012 | Kwak et al. | 455/69 |
| 8,286,052 B2 * | 10/2012 | Pan et al. | 714/758 |
| 8,380,195 B2 * | 2/2013 | Vasudevan et al. | 455/436 |
| 8,493,941 B2 * | 7/2013 | Nagaraj et al. | 370/335 |
| 8,498,331 B2 * | 7/2013 | Kato et al. | 375/240.01 |
| 8,634,404 B2 * | 1/2014 | Morimoto et al. | 370/350 |
| 2002/0090948 A1 * | 7/2002 | Nagata | 455/437 |
| 2003/0040306 A1 * | 2/2003 | Kentaro et al. | 455/422 |
| 2003/0125029 A1 * | 7/2003 | Han | 455/444 |
| 2003/0152031 A1 | 8/2003 | Toskala et al. | |
| 2004/0029602 A1 * | 2/2004 | Kunihiro | 455/500 |
| 2004/0160925 A1 * | 8/2004 | Heo et al. | 370/335 |
| 2004/0179493 A1 * | 9/2004 | Khan | 370/332 |
| 2004/0215809 A1 * | 10/2004 | Kim et al. | 709/232 |
| 2004/0218533 A1 * | 11/2004 | Kim et al. | 370/235 |
| 2006/0018282 A1 * | 1/2006 | Kwak et al. | 370/331 |
| 2006/0034240 A1 * | 2/2006 | Kwak et al. | 370/342 |
| 2006/0039299 A1 * | 2/2006 | Ihm et al. | 370/254 |
| 2006/0056354 A1 * | 3/2006 | Vasudevan et al. | 370/332 |
| 2006/0092876 A1 * | 5/2006 | Kwak et al. | 370/329 |
| 2006/0166673 A1 * | 7/2006 | Vasudevan | 455/439 |
| 2006/0176856 A1 * | 8/2006 | Yang et al. | 370/331 |
| 2006/0189323 A1 * | 8/2006 | Usuda et al. | 455/453 |
| 2006/0211391 A1 * | 9/2006 | Nishikawa et al. | 455/226.1 |
| 2007/0042785 A1 * | 2/2007 | Nakamata | 455/450 |
| 2007/0049278 A1 * | 3/2007 | Lindoff et al. | 455/439 |
| 2007/0060138 A1 * | 3/2007 | Kwak et al. | 455/445 |
| 2007/0097918 A1 * | 5/2007 | Cai et al. | 370/331 |
| 2007/0147266 A1 * | 6/2007 | Bachl et al. | 370/252 |
| 2007/0173257 A1 * | 7/2007 | Bakker et al. | 455/442 |
| 2008/0139237 A1 * | 6/2008 | Papasakellariou | 455/522 |
| 2009/0181673 A1 * | 7/2009 | Barrett | 455/436 |
| 2009/0228753 A1 * | 9/2009 | Pan et al. | 714/748 |
| 2009/0247168 A1 * | 10/2009 | Morimoto et al. | 455/437 |
| 2010/0008294 A1 * | 1/2010 | Palanki et al. | 370/328 |
| 2010/0014487 A1 * | 1/2010 | Attar et al. | 370/335 |
| 2010/0029319 A1 * | 2/2010 | Higuchi et al. | 455/522 |
| 2010/0075689 A1 * | 3/2010 | Uemura et al. | 455/452.1 |
| 2010/0103899 A1 * | 4/2010 | Kwak et al. | 370/329 |
| 2010/0120421 A1 * | 5/2010 | Li et al. | 455/432.3 |
| 2010/0130219 A1 * | 5/2010 | Cave et al. | 455/450 |
| 2010/0189067 A1 * | 7/2010 | Li et al. | 370/329 |
| 2010/0238888 A1 * | 9/2010 | Sampath et al. | 370/329 |
| 2010/0284356 A1 * | 11/2010 | Ray et al. | 370/329 |
| 2011/0255515 A1 * | 10/2011 | Maeda et al. | 370/331 |
| 2011/0296271 A1 * | 12/2011 | Tan et al. | 714/752 |
| 2012/0100878 A1 * | 4/2012 | Quek et al. | 455/507 |
| 2013/0136112 A1 * | 5/2013 | Montojo et al. | 370/337 |

FOREIGN PATENT DOCUMENTS

| | | |
|---|---|---|
| CN | 101174864 | 5/2008 |
| CN | 101278573 | 10/2008 |
| CN | 101364826 | 2/2009 |
| EP | 1530385 | 5/2005 |

OTHER PUBLICATIONS

Malkamaki, et al., Performance of Truncated Type-II Hybrid ARQ Schemes with Noisy Feedback Over Block Fading Channels, IEEE Trans. Commun., vol. 48, No. 9, pp. 1477-1487, Sep. 2000.

Liu, et al., Cross-Layer Combining of Adaptive Modulation and Coding with Truncated ARQ Over Wireless Links, IEEE Trans. Wireless Commun., vol. 3, No. 5, pp. 1746-1755, Sep. 2004.

Zhao, et al., Practical Relay Networks: A Generalization of Hybrid-Arq, IEEE J. Sel. Areas Commun., vol. 23, No. 1, pp. 7-18, Jan. 2005.

Yu, et al., Cooperative ARQ in Wireless Networks: Protocols Description and Performance Analysis, in Proc. IEEE Int. Conf. on Commun., vol. 8, Istanbul, Turkey, Jun. 2006, pp. 3608-3614.

Choi, et al., Cooperative ARQ with Phase Pre-Compensation, in Proc. IEEE Semiannual Veh. Technol. Conf., Baltimore, MD, Sep. 2007, pp. 215-219.

Dai, et al., Throughput Maximization of Ad-Hoc Wireless Networks Using Adaptive Cooperative Diversity and Truncated ARQ, IEEE Trans. Commun., vol. 56, No. 11, pp. 1907-1918, Nov. 2008.

Dahlman, et al., 3G evolution: HSPA and LTE for mobile broadband, Elsevier Ltd, First Edition, 2007.

Ericsson, LTE-Advanced—Coordinated Multipoint Transmission/Reception, in 3GPP R1-082469, TSG RAN WG1 Meeting53b, Warsaw, Poland, Jul. 2008.

ZTE, Uplink Comp Joint Processing Schemes, in 3GPP R1-090414, TSG RAN WG1 Meeting 55b, Ljubljana, Slovenia, Jan. 2009.

ZTE, Uplink Comp Joint Processing Schemes, in 3GPP R1-090071, TSG RAN WG1 Meeting 55b, Ljubljana, Slovenia, Jan. 2009.

Alcatel-Lucent, Efficient Uplink Coordinated Multi-Point Reception with Reduced Backhauling Cost, in 3GPP R1-091478, TSG RAN WG1 Meeting 56b, Seoul, Korea, Mar. 2009.

* cited by examiner

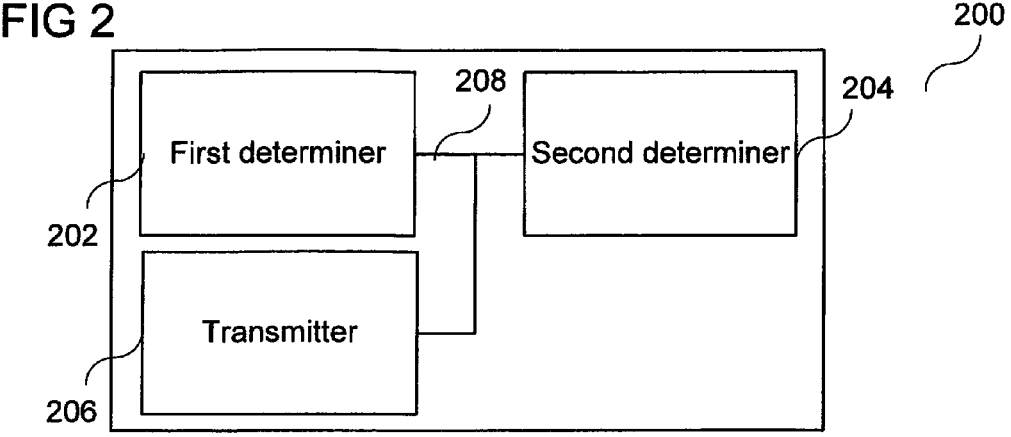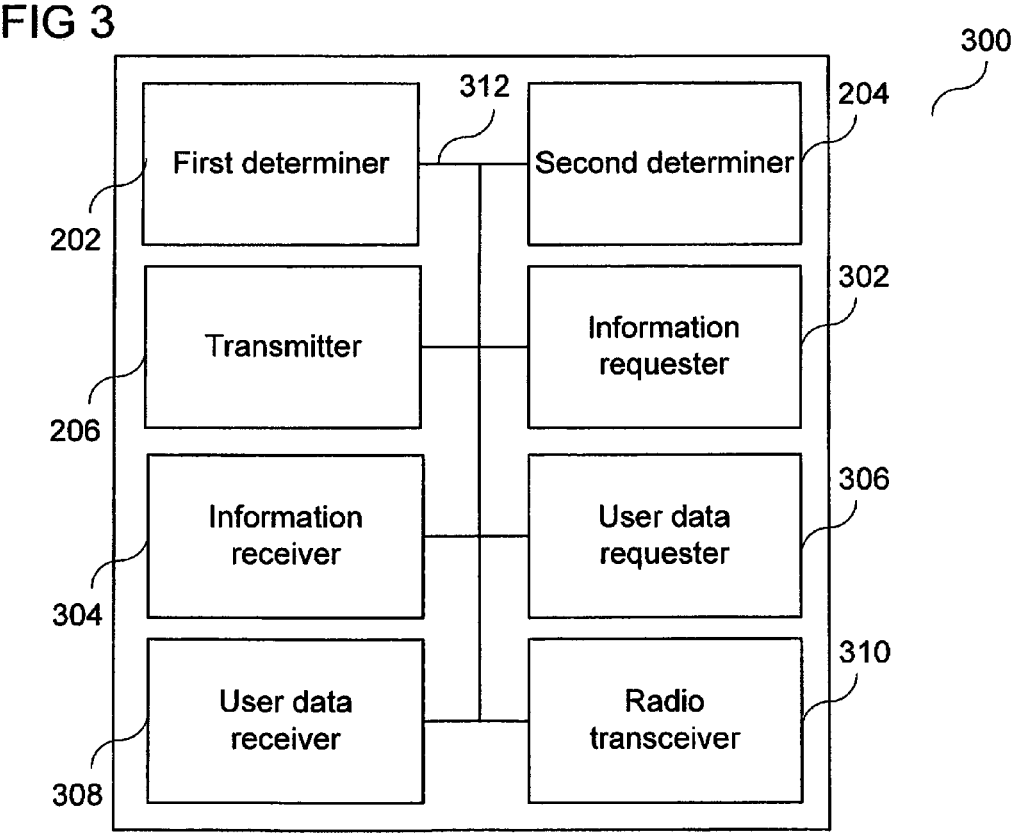

BASE STATIONS, CELLULAR COMMUNICATION SYSTEMS, METHODS FOR CONTROLLING A BASE STATION, AND METHODS FOR CONTROLLING A CELLULAR COMMUNICATION SYSTEM

TECHNICAL FIELD

Embodiments relate to base stations, cellular communication systems, methods for controlling a base station, and methods for controlling a cellular communication system.

BACKGROUND

In various cellular communication systems, a packet may be transmitted from a radio communication terminal to one or more base station. An acknowledgment may be sent to the radio communication terminal in case the packet has been properly received in the base station. A negative acknowledgement may be sent to the radio communication terminal in case the packet has not been properly received in the base station. The radio communication may decide on whether to re-transmit the packet, based on whether an acknowledgment or a negative acknowledgement is received in the base station.

SUMMARY

In various embodiments, a base station may be provided. The base station may include a first determiner configured to determine whether user data has been received from a radio communication terminal by the base station; a second determiner configured to determine whether information from which it may be determined that the user data has been received from the radio communication terminal by another base station has been received from the other base station; and a transmitter configured to transmit to the radio communication terminal information indicating whether at least one of the base station and the other base station has received the user data based on at least one of the result of the determination of the first determiner and the result of the determination of the second determiner.

In various embodiments, a base station may be provided. The base station may include a determiner configured to determine whether user data has been received from a radio communication terminal by the base station; and an information transmitter configured to transmit information from which it may be determined that the user data has been received from the radio communication terminal by the base station to another base station.

In various embodiments, a method for controlling a base station may be provided. The method may include determining by a first determiner of the base station whether user data has been received from a radio communication terminal by the base station; determining by a second determiner of the base station whether information from which it may be determined that the user data has been received from the radio communication terminal by another base station has been received from the other base station; and transmitting by a transmitter of the base station to the radio communication terminal information indicating whether at least one of the base station and the other base station has received the user data based on at least one of the result of the determining by the first determiner and the result of the determining by the second determiner.

In various embodiments, a method for controlling a base station may be provided. The method may include determining by a determiner of the base station whether user data has been received from a radio communication terminal by the base station; and transmitting by an information transmitter of the base station information from which it may be determined that the user data has been received from the radio communication terminal by the base station to another base station.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments of the invention are described with reference to the following drawings, in which:

FIG. 2 shows a base station in accordance with an embodiment;

FIG. 3 shows a base station in accordance with an embodiment;

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The word "exemplary" is used herein to mean "serving as an example, instance, or illustration". Any embodiment or design described herein as "exemplary" is not necessarily to be construed as preferred or advantageous over other embodiments or designs.

The various base stations, as will be described in more detail below, according to various embodiments may comprise a memory which is for example used in the processing carried out by the various devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In various embodiments, features may be explained for devices, and in some other embodiments, features may be explained for methods. It however will be understood that features for devices may be also provided for the methods, and vice versa.

Figure 1:
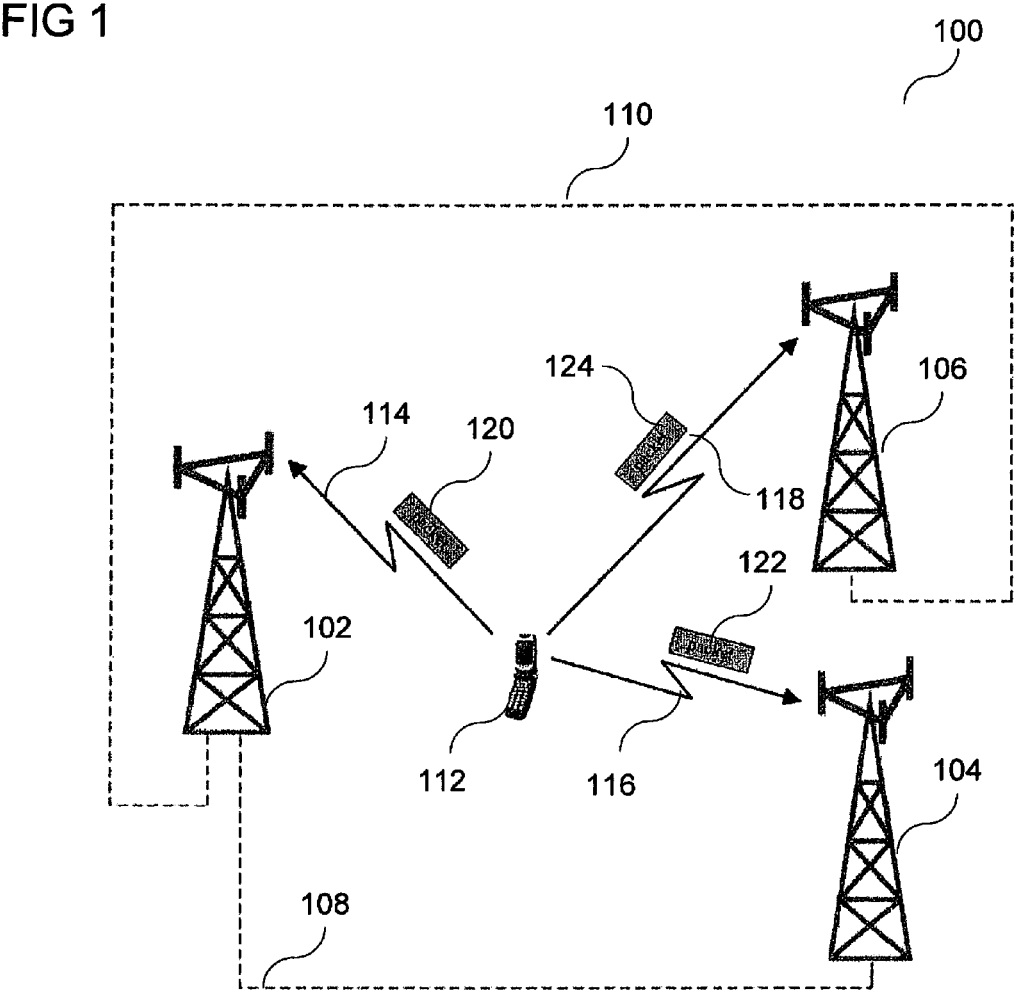
FIG. 1 shows a cellular communication system in accordance with an embodiment.

FIG. 1 shows a cellular communication system 100 in accordance with an embodiment. In the cellular communication system 100, a serving base station 102, as will be explained in more detail below, a first collaborative base station 104, as will be explained in more detail below, and a second collaborative base station 106, as will be explained in more detail below, each may receive data from a radio communication terminal 112. For example, the serving base station 102 may receive packet data 120 from the radio communication terminal 112 as indicated by arrow 114. For example, the first collaborative base station 104 may receive packet data 122 from the radio communication terminal 112 as indicated by arrow 116. For example, the second collaborative base station 106 may receive packet data 124 from the radio communication terminal 112 as indicated by arrow 118. The serving base station 102 may be connected to the first collaborative base station 104 by a first connection 108, for example a first backhaul link. The serving base station 102 may be connected to the second collaborative base station 106 by a second connection 110, for example a second backhaul link. In various embodiments, the first connection 108 and the second connection 110 may be direct connections without relay by another base station, or a radio network controller (RNC) or a remote network controller (RNC).

In various embodiments, a serving base station for a radio communication terminal may be a base station that is responsible for transmitting acknowledgement or non-acknowledgment, respectively, for a packet transmitted from the radio communication terminal to the radio communication terminal. In various embodiments, a collaborative base station for a radio communication terminal may be a base station, which may receive packets from the radio communication terminal, but which is does not transmit acknowledgment resp. non-acknowledgement for the packets to the radio communication terminal.

In various embodiments, a radio communication terminal may also be referred to as a user equipment (UE) or as a mobile station (MS).

It is to be noted that in the cooperative base station reception for three cells like shown in FIG. 1, the packet data transmitted to the various base station may result from one transmission of the radio communication terminal 112, but due to various transmission conditions, the packet data received in each of the serving base stations 102, the first collaborative base station 104 and the second collaborative base station 106 may vary. For example, transmission errors may occur and lead to the fact that not in all of the serving base stations 102, the first collaborative base station 104 and the second collaborative base station 106 the packet data may be received without transmission error.

Furthermore, it is to be noted that although two collaborative base stations are shown in FIG. 1, any number of collaborative base stations may be present, for example only one collaborative base station, or more than two collaborative base stations.

In various cellular communication systems, a packet may be transmitted from a radio communication terminal to one or more base stations. An acknowledgment may be sent to the radio communication terminal in case the packet has been properly received in the base station. A negative acknowledgement may be sent to the radio communication terminal in case the packet has not been properly received in the base station. The radio communication terminal may decide on whether to re-transmit the packet, based on whether an acknowledgment or a negative acknowledgement is received in the radio communication terminal.

FIG. 2 shows a base station 200 in accordance with an embodiment. The base station 200 may include a first determiner 202 configured to determine whether user data has been received from a radio communication terminal (not shown) by the base station 200, a second determiner 204 configured to determine whether information from which it may be determined that the user data has been received from the radio communication terminal by another base station (not shown) has been received from the other base station, and a transmitter 206 configured to transmit to the radio communication terminal information indicating whether at least one of the base station 200 and the other base station has received the user data based on at least one of (in various embodiments: based on both of) the result of the determination of the first determiner 202 and the result of the determination of the second determiner 204. The first determiner 202, the second determiner 204, and the transmitter 206 may be coupled with each other, e.g. via an electrical connection 208 such as e.g. a cable or a computer bus or via any other suitable electrical connection to exchange electrical signals. In various embodiments, the first determiner 202 and the second determiner 204 may be one physical component/circuit but running two times with similar or different determining methods.

In various embodiments, the information from which it may be determined that the user data has been received from the radio communication terminal by another base station may be a report message that does not including the user data.

In various embodiments, the information from which it may be determined that the user data has been received from the radio communication terminal by another base station is the user data.

In various embodiments, receiving the user data may be understood as receiving the user data properly. In various embodiments, receiving the user data may be understood as receiving the user data free from error. In various embodiments, receiving the user data may be understood as receiving the user data in a way that transmission errors may be compensated, for example by receiving redundant data and reconstructing the transmitted data even in the presence of transmission errors. In various embodiments, receiving the user data may be understood as receiving data that may be decoded correctly (for example by applying a cyclic redundancy check (CRC) in automatic repeat request (ARQ) transmission). In various embodiments, receiving the user data may be understood as receiving data that may be decoded with error but may be correctible by forward error control codes (FEC) (for example by applying hybrid ARQ (HARQ)). In various embodiments, receiving the user data may be understood as receiving data that may be decoded correctly after combination of two or more re-transmission from Mobile (for example by applying HARQ; for example, in a first transmission, all base stations (BSs) may not decode correctly, and based on HARQ, the serving BS may save the wrong data, and in the re-transmission phases, the base station, for example a serving BS, may determine based on the combination of received second or subsequent transmissions and saved data, whether the user data has been received).

In various embodiments, it may be determined whether the user data have been received properly when determining whether the user data have been received. In various embodiments, it may be determined whether the user data have been received free of error when determining whether the user data have been received. In various embodiments, it may be determined whether the user data have been received in a way that transmission errors may be compensated, for example by receiving redundant data and reconstructing the transmitted data even in the presence of transmission errors, when determining whether the user data have been received.

In various embodiments, the transmitter may be configured to wirelessly transmit information to the radio communication terminal.

In various embodiments, the transmitter may be configured to transmit an acknowledgement message to the radio communication terminal, in case it is determined by the first determiner 202 that the user data has been received from the radio communication terminal by the base station 200.

In various embodiments, the transmitter may be configured to transmit an acknowledgement message to the radio communication terminal, in case it is determined by the second determiner 204 that information from which it may be determined that the user data has been received from the radio communication terminal by the other base station has been received from the other base station.

In various embodiments, the transmitter 206 may be configured to transmit a negative acknowledgement message to the radio communication terminal, in case it is determined by the first determiner 202 that the user data has not been received from the radio communication terminal by the base station 200 and it is determined by the second determiner 204 that information from which it may be determined that the user data has been received from the radio communication terminal by the other base station has not been received from the other base station.

In various embodiments, the transmitter 206 may be configured to transmit a negative acknowledgement message to the radio communication terminal, in case it is not determined by the first determiner 202 that the user data has been received from the radio communication terminal by the base station 200 for a pre-determined time and it is not determined by the second determiner 204 that information from which it may be determined that the user data has been received from the radio communication terminal by the other base station has been received from the other base station for a pre-determined time.

In various embodiments, the other base station may be a non-serving base station for the radio communication terminal. In various embodiments, the other base station may be a collaborative base station for the radio communication terminal.

In various embodiments, the base station 200 may be configured according to at least one radio communication standard selected from a list of communication standards consisting of GSM (Global System for Mobile Communications); UMTS (Universal Mobile Telecommunications System); WiMax; LTE (Long Term Evolution); and LTE-advanced.

In various embodiments, the base station 200 and the other base station may be provided in a cellular communication system, where at least one radio network controller of the cellular communication system may be provided remote from the base station and the other base station. According to various embodiments, the base station 200, the other base station and the radio network controller may be disjoint devices.

In various embodiments, the base station may have an interface configured to communicate with another base station without a radio network controller.

In various embodiments, a radio network controller or an interface between base stations may be configured to send radio resource control information, for example radio resource control messages.

FIG. 3 shows a base station 300 in accordance with an embodiment. The base station 300, similar to the base station 200 of FIG. 2, may include a first determiner 202 configured to determine whether user data has been received from a radio communication terminal (not shown) by the base station 300. The base station 300, similar to the base station 200 of FIG. 2, may include a second determiner 204 configured to determine whether information from which it may be determined that the user data has been received from the radio communication terminal by another base station (not shown) has been received from the other base station. The base station 300, similar to the base station 200 of FIG. 2, may include a transmitter 206 configured to transmit to the radio communication terminal information indicating whether at least one of the base station 300 and the other base station has received the user data based on at least one of the result of the determination of the first determiner 202 and the result of the determination of the second determiner 204. The base station 300 may further include an information requester 302, as will be explained below. The base station 300 may further include an information receiver 304, as will be explained below. The base station 300 may further include a user data requester 306, as will be explained below. The base station 300 may further include a user data receiver 308, as will be explained below. The base station 300 may further include a radio transceiver 310, as will be explained below. The first determiner 202, the second determiner 204, the transmitter 206, the information requester 302, the information receiver 304, the user data requester 306, the user data receiver 308, and the radio transceiver 310, may be coupled with each other, e.g. via an electrical connection 312 such as e.g. a cable or a computer bus or via any other suitable electrical connection to exchange electrical signals. In various embodiments, the first determiner 202 and the second determiner 204 may be one physical component/circuit but running two times with similar or different determining methods.

In various embodiments, the information requester 302 may be configured to transmit to the other base station a request for information. In various embodiments, this information may be used to determine whether the user data has been received from the radio communication terminal by the other base station.

In various embodiments, the information receiver 304 may be configured to receive the information requested by the information requester 302.

In various embodiments, the information requester 302 may be further configured to transmit the request in case the first determiner 202 determines that the user data has not been received from the radio communication terminal by the base station 300.

In various embodiments, the user data requester 306 may be configured to transmit to the other base station a request for transmission of the user data.

In various embodiments, the user data receiver 308 may be configured to receive the user data requested by the user data requester 306.

In various embodiments, the radio transceiver 310 may be configured to wirelessly communicate with the radio communication terminal.

In various embodiments, at least one of the information requester 302, the information receiver 304, the user data requester 306 and the user data receiver 308 may use a predetermined interface for communication. The interface may include an interface for a direct connection between the base station 300 and the other base station. In various embodiments, the interface may include an X2 interface. According to various embodiments, the X2 interface may be an interface to allow base stations to interconnect with each other.

In various embodiments, the base station 300 may further include an acknowledgement determination circuit (not shown) configured to determine whether to acknowledge the reception of the user data to the radio communication terminal, based on a determination whether the user data may be reconstructed free of error based one at least one of the user data received by the base station 200 and the user data received by the other base station.

Figure 4:
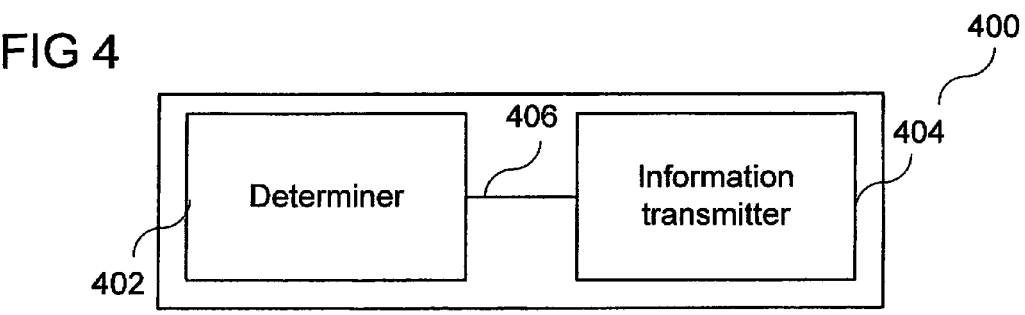
FIG. 4 shows a base station in accordance with an embodiment.

FIG. 4 shows a base station 400 in accordance with an embodiments. The base station 400 may include a determiner 402 configured to determine whether user data has been received from a radio communication terminal (not shown) by the base station 400, and an information transmitter 404 configured to transmit information from which it may be determined that the user data has been received from the radio communication terminal by the base station 400 to another base station (not shown). The determiner 402 and the information transmitter 404 may be coupled with each other, e.g. via an electrical connection 406 such as e.g. a cable or a computer bus or via any other suitable electrical connection to exchange electrical signals.

In various embodiments, receiving the user data may be understood as receiving the user data properly. In various embodiments, receiving the user data may be understood as receiving the user data free from error. In various embodiments, receiving the user data may be understood as receiving the user data in a way that transmission errors may be compensated, for example by receiving redundant data and reconstructing the transmitted data even in the presence of transmission errors. In various embodiments, receiving the user data may be understood as receiving data that may be decoded correctly (for example by applying a CRC check in automatic repeat request (ARQ) transmission). In various embodiments, receiving the user data may be understood as receiving data that may be decoded with error but may be correctible by forward error control codes (FEC) (for example by applying hybrid ARQ (HARQ)). In various embodiments, receiving the user data may be understood as receiving data that may be decoded correctly after combination of two or more re-transmission from Mobile (for example by applying HARQ; for example, in a first transmission, all base stations (BSs) may not decode correctly, and based on HARQ, the serving BS may save the wrong data, and in the re-transmission phases, the base station, for example a serving BS, may determine based on the combination of received second or subsequent transmissions and saved data, whether the user data has been received).

In various embodiments, it may be determined whether the user data have been received properly when determining whether the user data have been received. In various embodiments, it may be determined whether the user data have been received free of error when determining whether the user data have been received. In various embodiments, it may be determined whether the user data have been received data in a way that transmission errors may be compensated, for example by receiving redundant data and reconstructing the transmitted data even in the presence of transmission errors, when determining whether the user data have been received.

In various embodiments, the base station 400 may be a non-serving base station for the radio communication terminal. In various embodiments, the base station 400 may be a collaborative base station for the radio communication terminal.

In various embodiments, the other base station may be a serving base station.

In various embodiments, the base station 400 may be configured according to at least one radio communication standard selected from a list of communication standards consisting of: GSM; UMTS; WiMax; LTE; and LTE-advanced.

In various embodiments, the base station 400 and the other base station may be provided in a cellular communication system, where at least one radio network controller of the cellular communication system may be provided remote from the base station and the other base station. According to various embodiments, the base station, the other base station and the radio network controller may be disjoint devices.

In various embodiments, the base station may have an interface configured to communicate with another base station without a radio network controller.

In various embodiments, an interface between base stations or a radio network controller may be configured to send radio resource control information, for example radio resource control messages.

Figure 5:
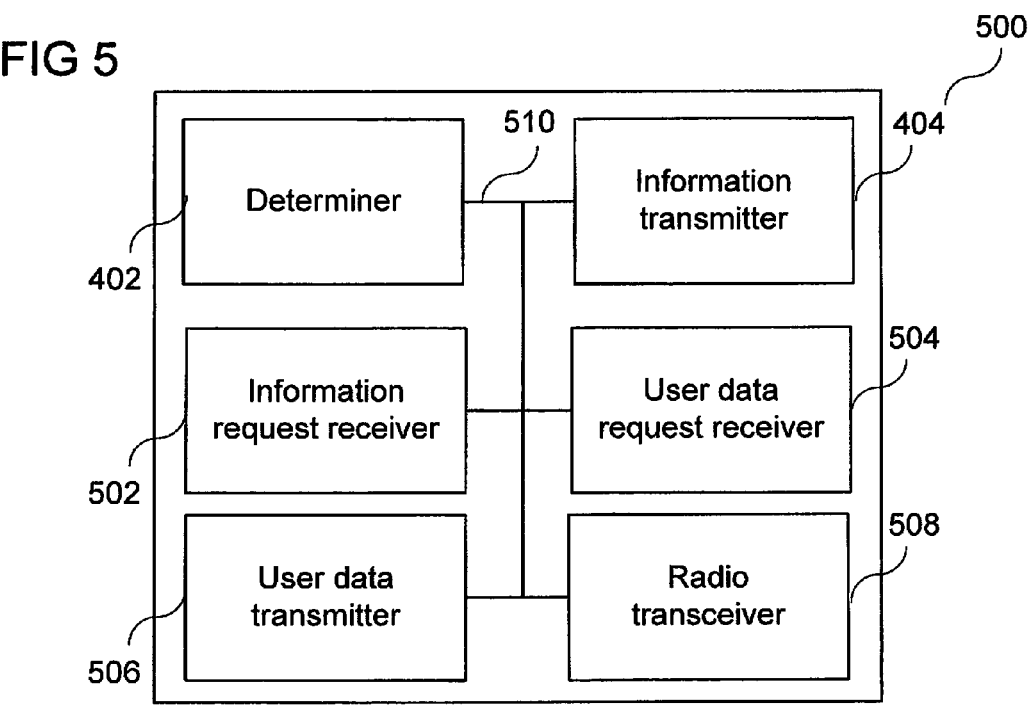
FIG. 5 shows a base station in accordance with an embodiment.

FIG. 5 shows a base station 500 in accordance with an embodiment. The base station 500, similar to the base station 400 of FIG. 4, may include a determiner 402 configured to determine whether user data has been received from a radio communication terminal (not shown) by the base station 500. The base station 500, similar to the base station 400 of FIG. 4, may include an information transmitter 404 configured to transmit information from which it may be determined that the user data has been received from the radio communication terminal by the base station 500 to another base station (not shown). The base station 500 may further include an information request receiver 502, as will be explained below. The base station 500 may further include an user data request receiver 504, as will be explained below. The base station 500 may further include a user data transmitter 506, as will be explained below. The base station 500 may further include a radio receiver 508, as will be explained below. The determiner 402, the information transmitter 404, the information request receiver 502, the user data request receiver 504, the user data transmitter 506, and the radio receiver 508 may be coupled with each other, e.g. via an electrical connection 510 such as e.g. a cable or a computer bus or via any other suitable electrical connection to exchange electrical signals.

In various embodiments, the information request receiver 502 may be configured to receive from the other base station a request for information.

In various embodiments, the information transmitter 400 may be further configured to transmit to the other base station the information requested from the information request receiver 502.

In various embodiments, the user data request receiver 504 may be configured to receive from the other base station a request for transmission of the user data.

In various embodiments, the user data transmitter 506 may be configured to transmit to the other base station the user data requested from the user data request receiver 504.

In various embodiments, the radio transceiver 508 may be configured to wirelessly receive from the radio communication terminal.

In various embodiments, the base station 500 may further include a radio receiver (not shown) configured to wirelessly receive from the radio communication terminal.

In various embodiments, at least one of the information transmitter 404, the information request receiver 502, the user data request receiver 504, and the user data transmitter 506 may use a predetermined interface for communication. The interface may include an interface for a direct connection between the base station 400 and the other base station. In various embodiments, the interface may include an X2 interface. According to various embodiments, the X2 interface may be an interface to allow base stations to interconnect with each other.

In various embodiments, the base station 400 in FIG. 4 or the base station 500 in FIG. 5 may be what is referred to as "the other base station" in the explanation of the base station 200 in FIG. 2 or the base station 300 of FIG. 3. Vice versa, "the other base station" in the explanation of the base station 400 of FIG. 4 or the base station 500 in FIG. 5 may be the base station 200 in FIG. 2 or the base station 300 of FIG. 3.

Figure 6:
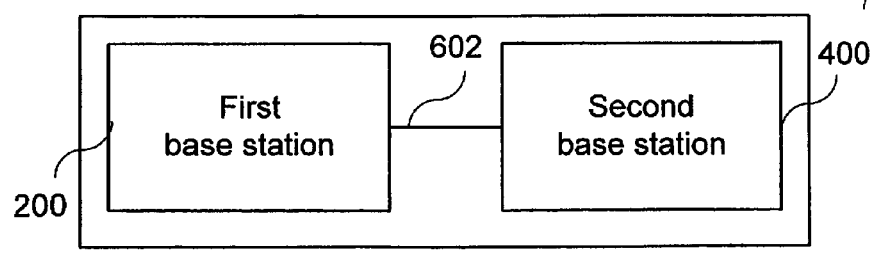
FIG. 6 shows a cellular communication system in accordance with an embodiment.

FIG. 6 shows a cellular communication system 600 in accordance with an embodiment. The cellular communication system 600 may include a first base station, for example the base station 200 of FIG. 2 or the base station 300 of FIG. 3 explained above, and a second base station, for example the base station 400 of FIG. 4 or the base station 500 of FIG. 5 explained above. The first base station and the second base station may be connected by a link 602 which may implement the pre-determined interface explained above.

Figure 7:
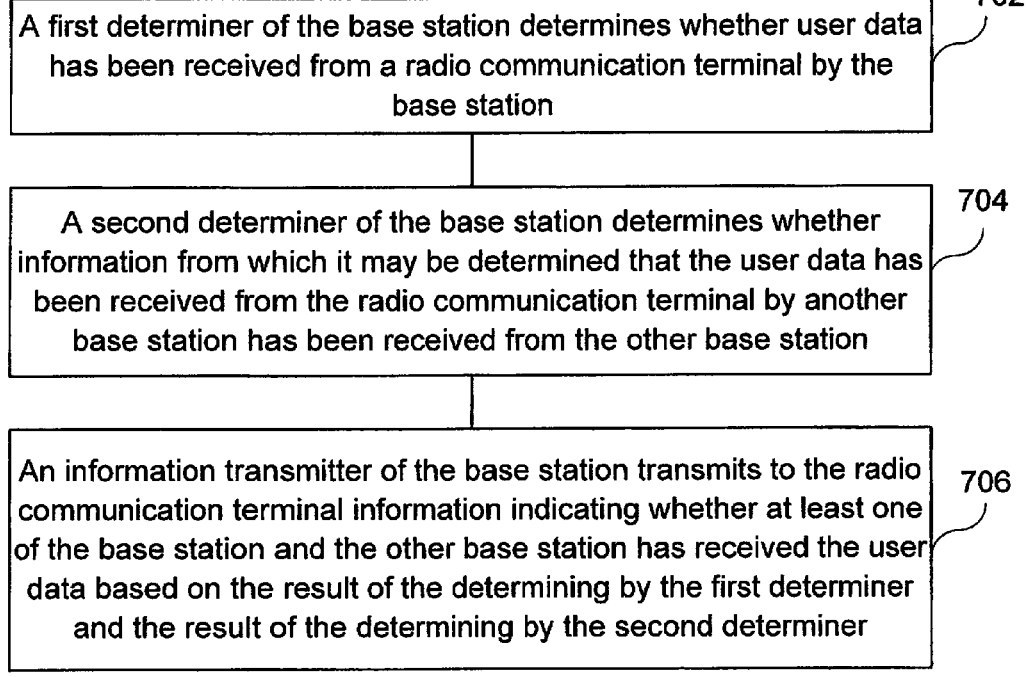
FIG. 7 shows a flow diagram illustrating a method for controlling base station in accordance with an embodiment.

FIG. 7 shows a flow diagram 700 illustrating a method for controlling a base station in accordance with an embodiment. In 702, a first determiner of the base station may determine whether user data has been received from a radio communication terminal by the base station. In 704, a second determiner of the base station may determine whether information from which it may be determined that the user data has been received from the radio communication terminal by another base station has been received from the other base station. In 706, a transmitter of the base station may transmit to the radio communication terminal information indicating whether at least one of the base station and the other base station has received the user data based on at least one of (in various embodiments: based on both of) the result of the determining by the first determiner and the result of the determining by the second determiner.

In various embodiments, receiving the user data may be understood as receiving the user data properly. In various embodiments, receiving the user data may be understood as receiving the user data free from error. In various embodiments, receiving the user data may be understood as receiving the user data in a way that transmission errors may be compensated, for example by receiving redundant data and reconstructing the transmitted data even in the presence of transmission errors. In various embodiments, receiving the user data may be understood as receiving data that may be decoded correctly (for example by applying a CRC check in automatic repeat request (ARQ) transmission). In various embodiments, receiving the user data may be understood as receiving data that may be decoded with error but may be correctible by forward error control codes (FEC) (for example by applying hybrid ARQ (HARQ)). In various embodiments, receiving the user data may be understood as receiving data that may be decoded correctly after combination of two or more re-transmission from Mobile (for example by applying HARQ; for example, in a first transmission, all base stations (BSs) may not decode correctly, and based on HARQ, the serving BS may save the wrong data, and in the re-transmission phases, the base station, for example a serving BS, may determine based on the combination of received second or subsequent transmissions and saved data, whether the user data has been received).

In various embodiments, it may be determined whether the user data have been received properly when determining whether the user data have been received. In various embodiments, it may be determined whether the user data have been received free of error when determining whether the user data have been received. In various embodiments, it may be determined whether the user data have been received data in a way that transmission errors may be compensated, for example by receiving redundant data and reconstructing the transmitted data even in the presence of transmission errors, when determining whether the user data have been received.

In various embodiments, the transmitter may transmit an acknowledgement message to the radio communication terminal, in case it is determined by the first determiner that the user data has been received from the radio communication terminal by the base station.

In various embodiments, the transmitter may transmit an acknowledgement message to the radio communication terminal, in case it is determined by the second determiner that information from which it may be determined that the user data has been received from the radio communication terminal by the other base station has been received from the other base station.

In various embodiments, the transmitter may transmit a negative acknowledgement message to the radio communication terminal, in case it is determined by the first determiner that the user data has not been received from the radio communication terminal by the base station and it is determined by the second determiner that information from which it may be determined that the user data has been received from the radio communication terminal by the other base station has not been received from the other base station.

In various embodiments, the transmitter may transmit a negative acknowledgement message to the radio communication terminal, in case it is not determined by the first determiner that the user data has been received from the radio communication terminal by the base station for a pre-determined time and it is not determined by the second determiner that information from which it may be determined that the user data has been received from the radio communication terminal by the other base station has been received from the other base station for a pre-determined time.

In various embodiments, an information requester of the base station may transmit to the other base station a request for information. In various embodiments, an information requester of the base station may transmit to the other base station a request for information from which it may be determined whether the user data has been received from the radio communication terminal by the other base station.

In various embodiments, an information receiver of the base station may receive the information requested by the information requester.

In various embodiments, the information requester may further transmit the request in case the first determiner determines that the user data has not been received from the radio communication terminal by the base station.

In various embodiments, a user data requester of the base station may transmit to the other base station a request for transmission of the user data.

In various embodiments, a user data receiver of the base station may receive the user data requested by the user data requester.

In various embodiments, the base station may be a serving base station for the radio communication terminal.

In various embodiments, the other base station may be a non-serving base station for the radio communication terminal. In various embodiments, the other base station may be a collaborative base station for the radio communication terminal.

In various embodiments, the base station and the other base station may be provided in a cellular communication system, where at least one radio network controller of the cellular communication system may be provided remote from the base station and the other base station. According to various embodiments, the base station, the other base station and the radio network controller may be disjoint devices.

In various embodiments, the base station may have an interface configured to communicate between base stations without a radio network controller.

In various embodiments, an interface between base stations or a radio network controller may be configured to send radio resource control information, for example radio resource control messages.

In various embodiments, at least one of the information requester, the information receiver, the user data requester and the user data receiver may use a predetermined interface for communication. The interface may include an interface for a direct connection between the base station and the other base station. In various embodiments, the interface may include an X2 interface. According to various embodiments, the X2 interface may be an interface to allow base stations to interconnect with each other.

In various embodiments, an acknowledgement determination circuit of the base station may determine whether to acknowledge the reception of the user data to the radio communication terminal, based on a determination whether the user data may be reconstructed free of error based one at least one of the user data received by the base station and the user data received by the other base station.

In various embodiments, the base station may perform radio communication according to at least one radio communication standard selected from a list of communication standards consisting of: GSM; UMTS; WiMax; LTE; and LTE-advanced.

In various embodiments, a radio transceiver of the base station may communicate wirelessly with the radio communication terminal.

Figure 8:
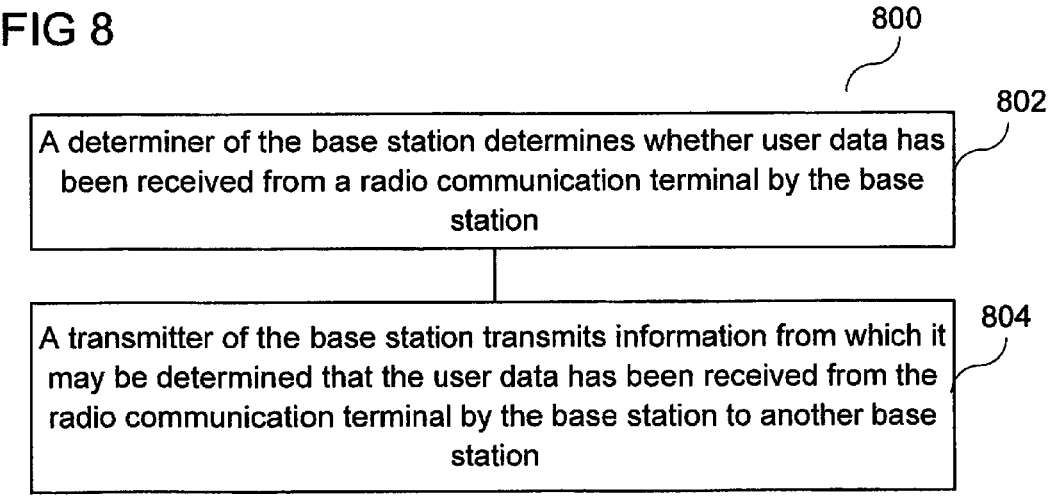
FIG. 8 shows a flow diagram illustrating a method for controlling base station in accordance with an embodiment.

FIG. 8 shows a flow diagram 800 illustrating a method for controlling base station in accordance with an embodiment.

In 802, a determiner of the base station may determine whether user data has been received from a radio communication terminal by the base station. In 804, an information transmitter of the base station may transmit information from which it may be determined that the user data has been received from the radio communication terminal by the base station to another base station.

In various embodiments, receiving the user data may be understood as receiving the user data properly. In various embodiments, receiving the user data may be understood as receiving the user data free from error. In various embodiments, receiving the user data may be understood as receiving the user data in a way that transmission errors may be compensated, for example by receiving redundant data and reconstructing the transmitted data even in the presence of transmission errors. In various embodiments, receiving the user data may be understood as receiving data that may be decoded correctly (for example by applying a CRC check in automatic repeat request (ARQ)). In various embodiments, receiving the user data may be understood as receiving data that may be decoded with error but may be correctible by forward error control codes (FEC) (for example by applying hybrid ARQ (HARQ)). In various embodiments, receiving the user data may be understood as receiving data that may be decoded correctly after combination of two or more re-transmission from Mobile (for example by applying HARQ; for example, in a first transmission, all base stations (BSs) may not decode correctly, and based on HARQ, the serving BS may save the wrong data, and in the re-transmission phases, the base station, for example a serving BS, may determine based on the combination of received second or subsequent transmissions and saved data, whether the user data has been received).

In various embodiments, it may be determined whether the user data have been received properly when determining whether the user data have been received. In various embodiments, it may be determined whether the user data have been received free of error when determining whether the user data have been received. In various embodiments, it may be determined whether the user data have been received data in a way that transmission errors may be compensated, for example by receiving redundant data and reconstructing the transmitted data even in the presence of transmission errors, when determining whether the user data have been received.

In various embodiments, an information request receiver of the base station may receive from the other base station a request for information from which it may be determined whether the user data has been received from the radio communication terminal by the base station.

In various embodiments, the information transmitter may further transmit to the other base station the information requested from the information request receiver.

In various embodiments, a user data request receiver of the base station may receive from the other base station a request for transmission of the user data.

In various embodiments, a user data transmitter of the base station may transmit to the other base station the user data requested from the user data request receiver.

In various embodiments, the base station may be a non-serving base station for the radio communication terminal. In various embodiments, the base station may be a collaborative base station.

In various embodiments, the other base station may be a serving base station.

In various embodiments, at least one of the information transmitter, the information request receiver, the user data request receiver, and the user data transmitter may use a predetermined interface for communication. The interface may include an interface for a direct connection between the base station and the other base station. In various embodiments, the interface may include an X2 interface. According to various embodiments, the X2 interface may be an interface to allow base stations to interconnect with each other.

In various embodiments, the base station may perform radio communication according to at least one radio communication standard selected from a list of communication standards consisting of: GSM; UMTS; WiMax; LTE; and LTE-advanced.

In various embodiments, the base station and the other base station may be provided in a cellular communication system, where at least one radio network controller of the cellular communication system may be provided remote from the base station and the other base station. According to various embodiments, the base station, the other base station and the radio network controller may be disjoint devices.

In various embodiments, the base station may have an interface configured to communicate with another base station without a radio network controller.

In various embodiments, an interface between base stations or a radio network controller may be configured to send radio resource control information, for example radio resource control messages.

In various embodiments, a radio transceiver of the base station may communicate wirelessly with the radio communication terminal.

In various embodiments, a radio receiver of the base station may receive wirelessly from the radio communication terminal.

In an embodiment, a method for controlling a cellular communication system including a first base station and a second base station may be provided. The method may include the method for controlling the first base station by a method explained with reference to FIG. 7 and the method for controlling the second base station by a method explained with reference to FIG. 8.

According to various embodiments, methods and devices for opportunistic collaborative base station reception in uplink transmissions may be provided.

According to various embodiments, methods and devices for cooperative transmission and processing at multiple base stations, for example eNode-Bs, for wireless communications may be provided.

According to various embodiments, for example in a cellular communication system according to LTE-A, coordinated multiple point transmission/reception (CoMP) may be provided to improve the performance of the cell-edge UEs. In various embodiments providing CoMP, the spatial diversity in multiple eNode-Bs may be exploited by providing multiple eNode-Bs working in cooperation via backhaul links to enhance the reliability of the links between UE and the serving eNode-B. In UL (uplink) CoMP, multiple eNode-Bs may be provided receiving the signals transmitted from a UE and the exchange of decoded signals or un-decoded signals via the backhaul links to the serving eNode-B, which may perform joint processing of the aggregate received signals.

According to various embodiments, in wireless communications, the desire for high data rate may be growing rapidly. However, the performance of wireless links may be a bottleneck to achieve the goal due to the limited bandwidth and the channel degradation. At the physical layer, diversity and/or forward error correction may be used to pave the way to make the most of the wireless links. Since wireless environments may be dynamic, using a fixed diversity and/or forward error correction scheme may be costly or may result in failure. The adaptive modulation and coding (AMC) may be used to enhance the efficiency. An alternative to AMC may be the automatic repeat request (ARQ) protocol at the data link layer, which may be a protocol that may request retransmissions for the packets received in error. Since the retransmissions may be requested only when necessary, the channel degradation may be combated efficiently.

ARQ with cooperative diversity may be provided to enhance the reliability of the wireless links. Cooperative relay networks may provide diversity but more channels may be required for relaying. The additional channels may always be occupied even though the relaying may not be necessary. According to various embodiments, the cooperative ARQ may result in improved throughput.

In various wireless environments, the coherence time of the channel condition of the wireless link may be long compared to the packet length. Without employing the cooperative base station diversity, the retransmissions requested by ARQ may experience the identical channel, and may provide only marginal improvement when the channel is in deep fade. Therefore, employing the cooperative ARQ may alleviate this problem.

A remote network controller (RNC) or a radio network controller (RNC) can connect to all eNode-Bs to coordinate all the ARQ transmissions. Since a RNC may be located far away from the eNode-Bs, large latency between RNC and eNode-Bs may be present. Instead of relying on a RNC, according to various embodiments, backhaul links between eNode-Bs may be used to enable collaboration between eNode-Bs to improve ARQ transmissions. Due to closer proximity of eNode-Bs, smaller latency between collaborate eNode-Bs may be present.

According to various embodiments, methods and devices for an opportunistic CoMP for UL in single-frequency cellular networks may be provided. According to various embodiments, uplink CoMP and cooperative ARQ may be provided. In accordance with various embodiments, only minimal coordination may be desired between the eNode-Bs and cooperative ARQ may be applied in an opportunistic manner.

According to various embodiments, methods and devices for an opportunistic CoMP for UL transmissions in single frequency cellular networks may be provided.

According to various embodiments, opportunistic collaboration among the eNode-Bs may improve the UL ARQ transmissions. According to various embodiments, the average packet error rate (PER) may be derived.

According to various embodiments, the reliability of the UL ARQ transmissions may be improved.

In various embodiments, a single-frequency multi-cell network with K+1 eNode-Bs may be provided (where K may be an integer number). For example, FIG. 1 may illustrate the UL CoMP for K=2. Each shown eNode-B (for example the serving BS 102, the first collaborative BS 104, and the second collaborative BS 106) may be equipped with one antenna and there may exist a wired backhaul link between each shown eNode-B (for example, a first wired backhaul link 108 between the serving BS 102 and the first collaborative BS 104, and a second wired backhaul link 110 between the serving BS 106 and the second collaborative BS 106), where each backhaul link may be modeled as an additive white Gaussian noise (AWGN) channel model with squared standard deviation $\sigma^2_b$. There may be a single UE (user equipment) 112 transmitting packets to its serving eNode-B 102 and the packets may also be received at the K collaborative eNode Bs 104, 106.

In a first-time slot, the UE 112 may transmit a packet 120 to its serving eNode-B 102. The ith symbol in the nth packet received at the serving eNode-B 102 and the K collaborative eNode-Bs 104, 106 may then be written as $$r[i,n] = \sqrt{E_s} h[n] x[i,n] + z[i,n], \quad (1)$$

$$r_k[i,n] = \sqrt{E_s} h_k[n] x[i,n] + z_k[i,n], \quad k \in \kappa \quad (2)$$

where $k=\{1,2,\ldots,K\}$, $r[i,n]$, and $r_k[i,n]$ may denote the complex baseband equivalent received signals in the serving eNode-B 102 and the kth collaborative eNode-B, respectively and $x[i,n]$ may denote the ith transmitted symbol in the nth packet with energy $E_s$. The complex circularly symmetric Gaussian noise at the serving eNode-B and the kth collaborative eNode-B may be denoted by $z[i,n] \sim CN(0,N_0)$ and $z[i,n] \sim CN(0,N_0)$, respectively. The complex channel coefficients from the UE to its serving eNode-B and the kth collaborative eNode-B may be denoted by $h[n] \sim CN(0, \sigma_s^2)$ and $h_k[n] \sim CN(0, \sigma_k^2)$, respectively, and may be assumed to be constant throughout the whole packet. By denoting the instantaneous received signal-to-noise ratios (SNRs) at the serving eNode-B and the kth collaborative eNode-B as $\gamma_s = E_s|h[n]|^2/N_0$ and $\gamma_k = E_s|h_k[n]|^2/N_0$, $\gamma_s$ and $\gamma_k$ may be modeled as exponentially distributed random variables with mean $\lambda_s$ and $\lambda_k$, respectively.

According to various embodiments, methods and devices to enhance the reliability of packet transmission may be provided. For example, different type of ARQ protocols and UL CoMP may be provided. Details of protocols according to various embodiments will be described below.

Figure 9:
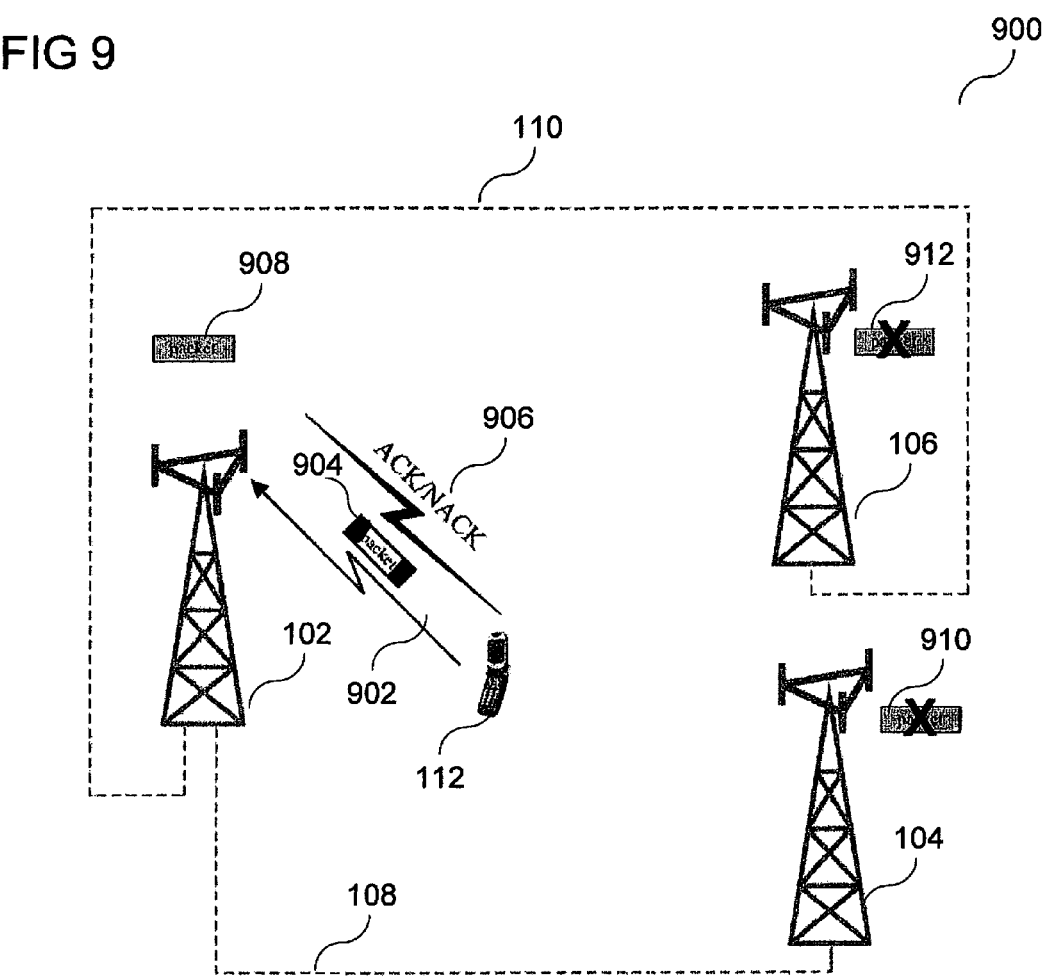
FIG. 9 shows a cellular communication system in accordance with an embodiment.

FIG. 9 shows a cellular communication system 900 in accordance with an embodiment. Various components of the cellular communication system 900 may be identical or similar to the components of the cellular communication system 100 described with reference to FIG. 1, and for these components, the same reference numerals may be used and duplicate description thereof may be omitted. It is to be noted that a first portion of the first time slot of the cellular communication system 900 may be performed like described with reference to the cellular communication system 100 of FIG. 1 above, and that with reference to FIG. 9, processing according to various embodiments at the end of the first time slot may be described.

In the cellular communication system 900, a first protocol may be applied. The first protocol may be an ARQ protocol, which may not exploit UL CoMP. To reduce packet delay and system buffer size, a truncated ARQ that may limit on the number of maximum retransmission attempts, which may be denote as $N_t$ may be applied. At the end of the first time slot, only the serving eNode-B 102 may check if the received packet is received correctly using the cyclic redundancy check (CRC) bits attached to the transmitted packet, as indicated by non crossed packet symbol 908. If no error is detected in the packet, the serving eNode-B 102 may send a one-bit acknowledgment (ACK) message 906 to the UE, indicating successful reception of the packet. Otherwise, a one bit non-acknowledgment (NACK) 906 message may be sent. The UE may continue to retransmit (as indicated by arrow 902) the packet 904 until it reaches the maximum number of retransmission attempts. Throughout this process, the packets received at the K collaborative eNode-Bs 104, 106 may be deleted upon reception without performing any processing as indicated by a first crossed packet symbols 910 for the first collaborative base station 104 and a second crossed packet symbols 912 for the second collaborative base station 106.

Figure 10:
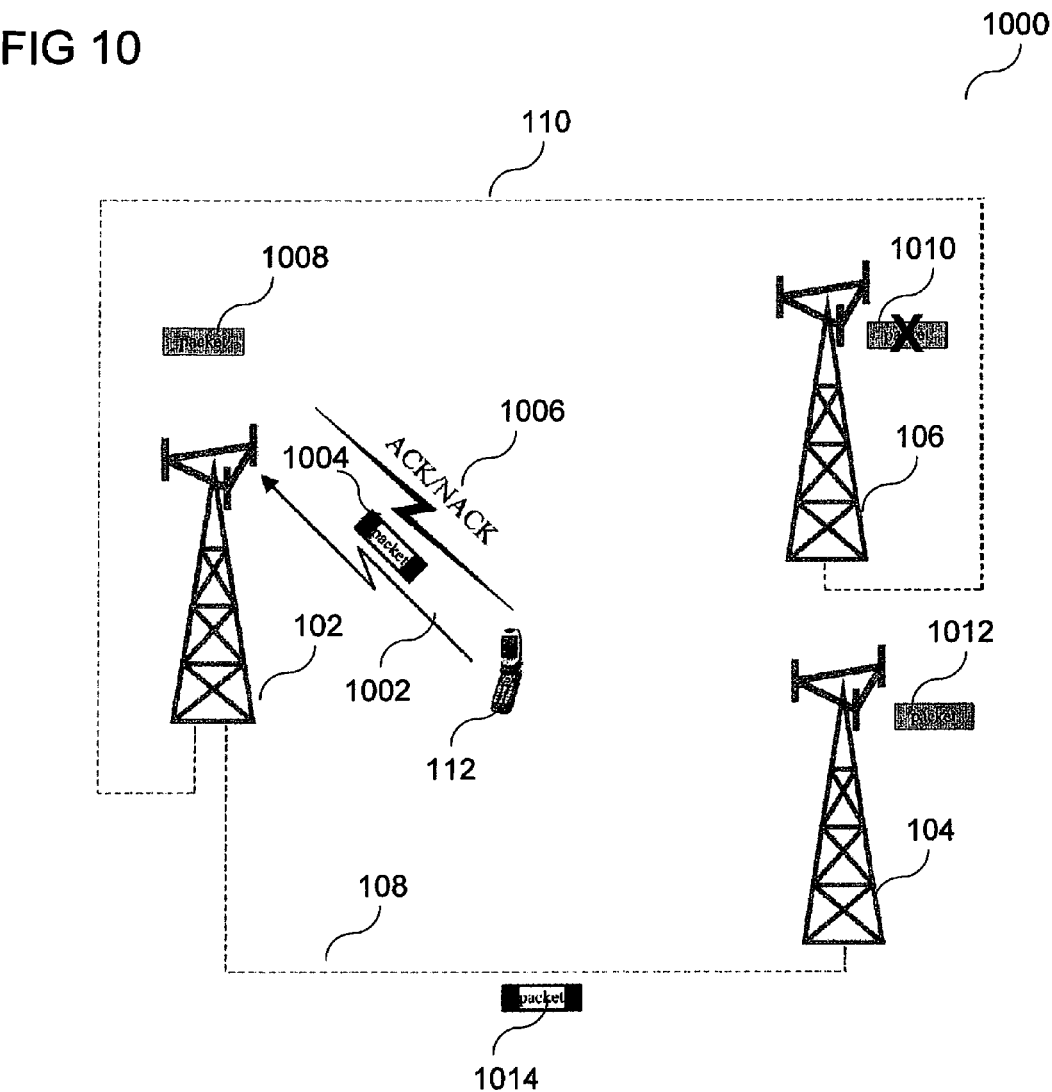
FIG. 10 shows a cellular communication system in accordance with an embodiment.

FIG. 10 shows a cellular communication system 1000 in accordance with an embodiment. Various components of the cellular communication system 1000 may be identical or similar to the components of the cellular communication system 100 described with reference to FIG. 1, and for these components, the same reference numerals may be used and duplicate description thereof may be omitted. It is to be noted that a first portion of the first time slot of the cellular communication system 1000 may be performed like described with reference to the cellular communication system 100 of FIG. 1 above, and that with reference to FIG. 10, processing according to various embodiments at the end of the first time slot may be described.

In the cellular communication system 1000, a second protocol may be applied. In contrast to the first protocol described above, this second protocol may take advantage of the broadcast nature of the UL transmissions to reach the collaborative eNode-Bs as illustrated in FIG. 10. For example with the CRC (cyclic redundancy check) to facilitate error detection, the collaborative eNode-Bs 104, 106 may check if they have correctly received their packets. For example, the second collaborative base station 106 may check the packet, and may for example determine that it has not correctly received the packet, as indicated by a crossed packet 1010. For example, the first collaborative base station 104 may check the packet, and may for example determine that it has correctly received the packet, as indicated by a non-crossed packet 1012. Only those collaborative eNode-Bs that have correctly received the packet, may be desired to participate in the cooperative phase by forwarding their packets via dedicated wired backhaul links 108, 110. For example, the first collaborative BS 104 may transmit the packet 1014 to the serving BS 102 via the first backhaul 108. The serving BS may perform a CRC check of the packet 1008 received from the radio communication terminal 112. As will be explained with reference to FIG. 11 in more detail below, the serving eNode-B 102 may make a joint detection based on the packets received from the UE and the collaborative eNode-Bs. At the end of the cooperative phase, an ACK/NACK message 1006 may be sent to the UE depending on the success or failure of the transmission. Upon reception of an ACK 1006 at the UE 112, the UE 112 may prepare to transmit a new packet in the next data slot. Otherwise, the UE 112 may continue to retransmit (as indicated by arrow 1002) its packet 1004 until $N_t$ retransmission attempts are reached. Considering the cost of backhaul architecture, the collaborative eNode-Bs 106, 108 may not be desired to retransmit its packet to the serving eNode-B.

In the cooperative phase, the ith symbol in the nth packet received at the serving eNode-B from the kth collaborative eNode-B may be given by $$r_{b,k}^{(II)}[i,n] = \sqrt{E_s} x[i,n] + z_{b,k}[i,n], \quad k \in \kappa_c \quad (3)$$

where $r^{(II)}_{b,k}[i,n]$ may denote the complex baseband equivalent received signal in the serving eNode-B via the kth backhaul link using the second protocol and the complex circularly symmetric Gaussian noise at the serving eNode-B may be denoted by $z_{b,k}[i,n] \sim CN(0, \sigma_b^2)$. The received SNR at the serving eNode-B 102 via the kth backhaul link may be denoted as $\gamma_{b,k} = E_s/\sigma_b^2$.

Figure 11:
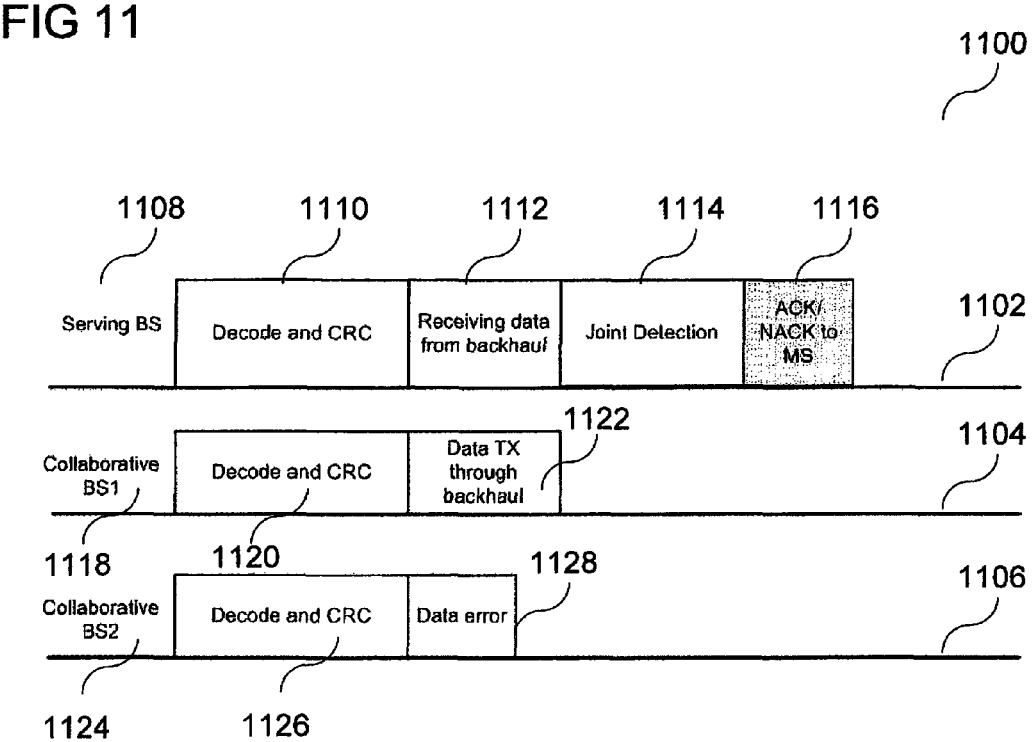
FIG. 11 shows an illustration of a method for controlling a cellular communication system in accordance with an embodiment.

FIG. 11 shows an illustration 1100 of a method for controlling a cellular communication system in accordance with an embodiment. Processing 1108 of the serving base station 102 is shown over a first time axis 1102. Processing 1118 of the first collaborative BS 104 is shown over a second time axis 1104. Processing 1124 of the second collaborative BS 106 is shown over a third time axis 1106. The first time axis 1102, the second time axis 1104 and the third time axis 1106 may be parallel or almost parallel; for example, processes shown at the same horizontal position may be performed at the same or almost same time.

In 1110, the serving BS 102 may perform decoding and CRC of the packet received in the serving BS 102. In 1120, the first collaborative BS 104 may perform decoding and CRC of the packet received in the first collaborative BS 104. In 1126, the second collaborative BS 106 may perform decoding and CRC of the packet received in the second collaborative BS 106.

In 1122, the first collaborative BS 104 may transmit the packet data 1014 through the backhaul 108 to the serving BS 102. In 1128, the second collaborative BS 106 may stop processing for the present time slot if the received data is determined in error. In 1112, the serving BS 102 may receive the packet data 1014 from the first collaborative BS 104 using the backhaul 108.

In 1114, the serving BS 102 may perform joint detection, for example, may determine, whether at least one packet of the packet 1008 received from the radio communication terminal 112 and the packet 1014 received from the second collaborative base station 106 has been received correctly (in other words: properly), for example free from error.

In 1116, the serving BS 102 may transmit an acknowledgement resp. a non-acknowledgment to the radio communication terminal 112 (for example a mobile station (MS)), based on the determination of the joint detection 1114.

Figure 12:
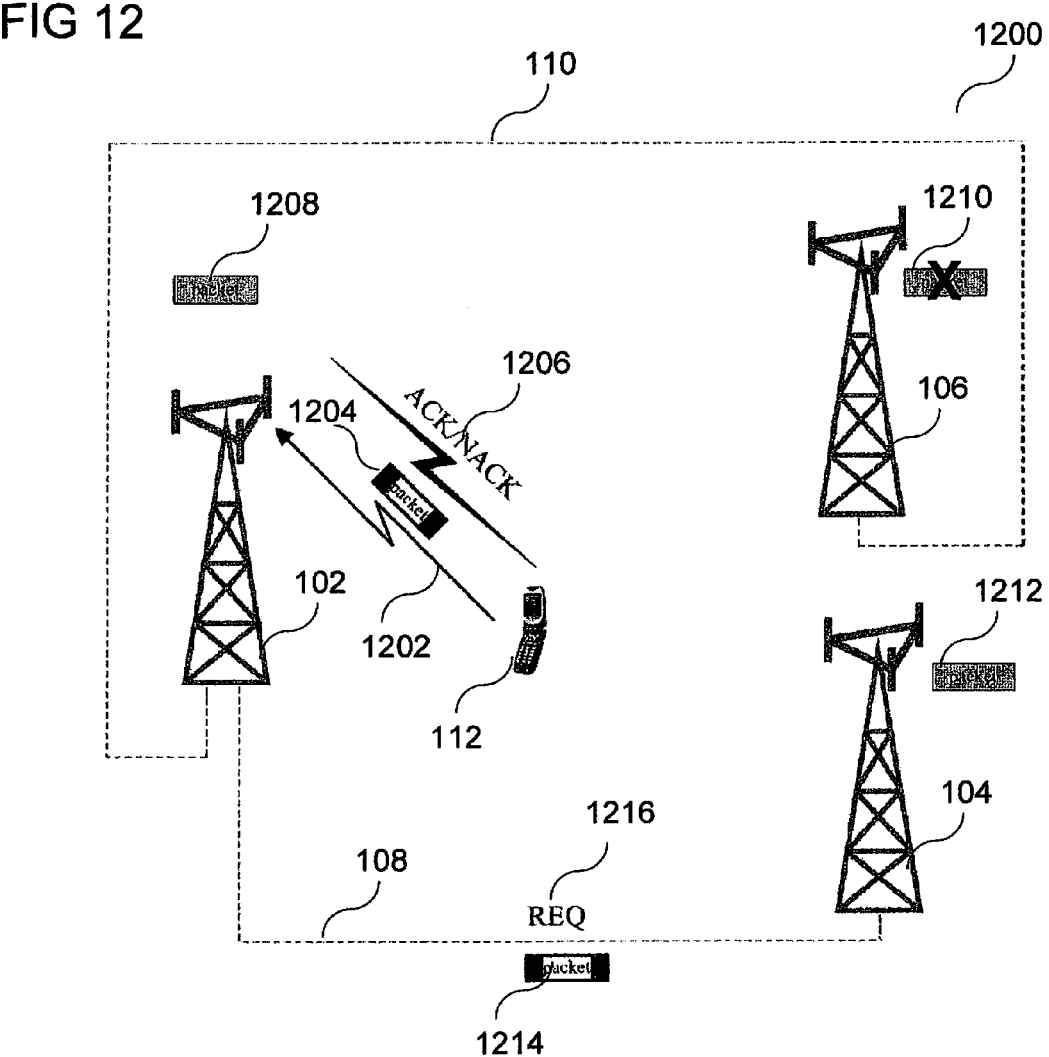
FIG. 12 shows a cellular communication system in accordance with an embodiment.

FIG. 12 shows a cellular communication system 1200 in accordance with an embodiment. Various components of the cellular communication system 1200 may be identical or similar to the components of the cellular communication system 100 described with reference to FIG. 1, and for these components, the same reference numerals may be used and duplicate description thereof may be omitted. It is to be noted that a first portion of the first time slot of the cellular communication system 1200 may be performed like described with reference to the cellular communication system 100 of FIG. 1 above, and that with reference to FIG. 12, processing according to various embodiments at the end of the first time slot may be described.

In the cellular communication system 1200, a third protocol may be applied. Similar to the second protocol, this protocol may take advantage of the broadcast nature of the UL transmissions to reach the collaborative eNode-Bs as shown in FIG. 12. Unlike the second protocol, if no error is detected in the packet 1208 received by the serving BS 102 from the radio communication terminal 112, the serving eNode-B 102 may immediately send the ACK message 1206 to the UE 112. Moreover, upon failure in CRC check, the serving eNode-B 102 may send a request (REQ) message to the collaborative eNode-Bs through the backhaul links to request for packet forwarding. For example, a REQ message 1216 may be sent to the first collaborative BS 104. For example, the second collaborative BS 106 may have not properly received the packet 1210, as indicated by a crossed packet 1210. For example, the first collaborative BS 104 may have properly received the packet 1212, as indicated by a non-crossed packet 1212. As will be explained with reference to FIG. 13 in more detail below, the serving eNode-B 102 may then make a joint detection based on the packet 1208 received from the UE 112 and the packet received from the collaborative eNode-Bs (for example the packet 1214 received from the first collaborative BS 104). At the end of the cooperative phase, an ACK/NACK message 1206 may be sent to the UE depending on the success or failure of the transmission. According to various embodiments, the duration of the cooperative phase may be reduced by using this third protocol compared to the second protocol since cooperation may be activated only when needed through a REQ message.

Upon reception of an ACK 1206 at the UE 112, the UE 112 may prepare to transmit a new packet in the next data slot. Otherwise, the UE 112 may continue to retransmit (as indicated by arrow 1202) its packet 1204 until $N_t$ retransmission attempts are reached.

Figure 13:
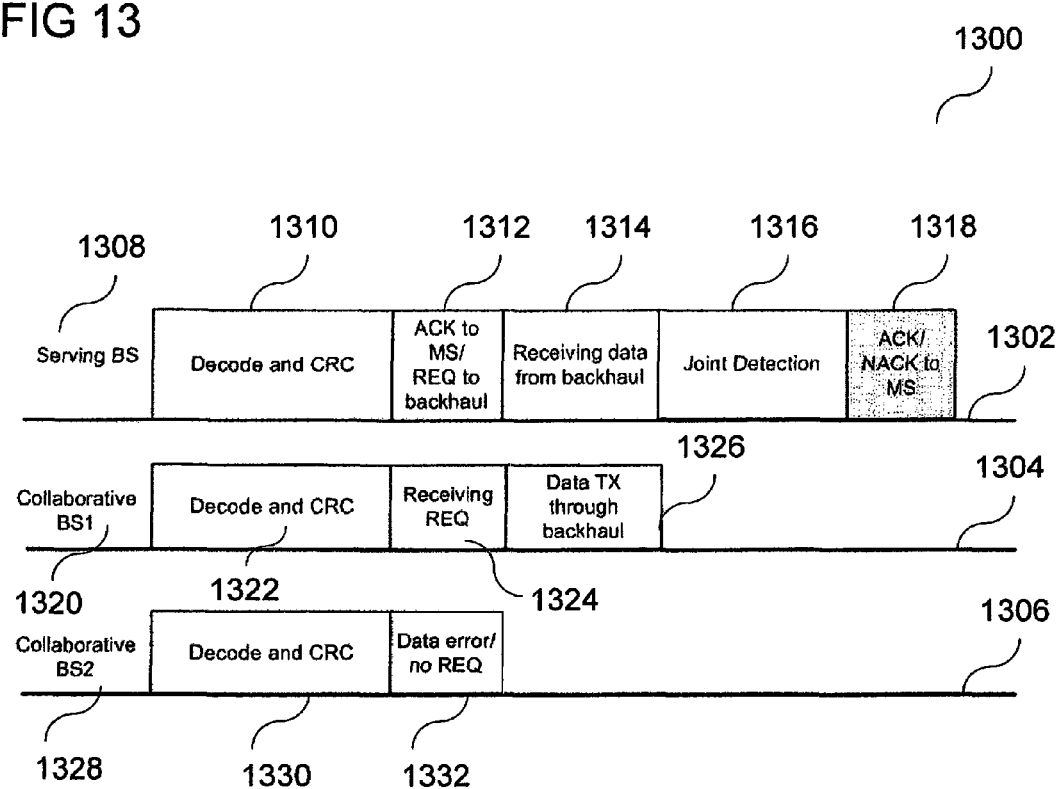
FIG. 13 shows an illustration of a method for controlling a cellular communication system in accordance with an embodiment.

FIG. 13 shows an illustration 1300 of a method for controlling a cellular communication system in accordance with an embodiment. Processing 1308 of the serving base station 102 is shown over a first time axis 1302. Processing 1320 of the first collaborative BS 104 is shown over a second time axis 1304. Processing 1328 of the second collaborative BS 106 is shown over a third time axis 1306. The first time axis 1302, the second time axis 1304 and the third time axis 1306 may be parallel or almost parallel, for example, processes shown at the same horizontal position may be performed at the same or with a small time difference. The time differences, if any, may be related to the different arrival time of the packet at different base stations, as the distances between UE and different base stations vary.

In 1310, the serving BS 102 may perform decoding and CRC of the packet received in the serving BS 102. In 1322, the first collaborative BS 104 may perform decoding and CRC of the packet received in the first collaborative BS 104. In 1130, the second collaborative BS 106 may perform decoding and CRC of the packet received in the second collaborative BS 106.

In 1312, the serving BS 102 may either send an ACK 1206 to the radio communication terminal 112 (for example a MS 112) or may send a REQ 1214 to the first collaborative BS 104 or the second collaborative BS 106 using the backhaul. In 1324, the first collaborative BS 104 may receive the REQ. In 1326, the first collaborative BS 104 may transmit the packet data 1214 through the first backhaul 108 to the serving BS 102. In 1314, the serving BS 102 may receive the packet data 1214 from the first collaborative BS 104 using the first backhaul 108.

In 1316, the serving BS 102 may perform joint detection, for example, may determine, whether at least one packet of the packet 1008 received from the radio communication terminal 112 and the packet 1014 received from the first collaborative base station 104 has been received correctly (in other words: properly), for example free from error.

In 1332, the second collaborative BS 106 may stop processing for the present time slot after either detecting a data error or determining, that it has not received a REQ.

In 1318, the serving BS 102 may transmit an acknowledgement resp. a non-acknowledgment to the radio communication terminal 112 (for example a mobile station (MS)), based on the determination of the joint detection 1316.

Figure 14:
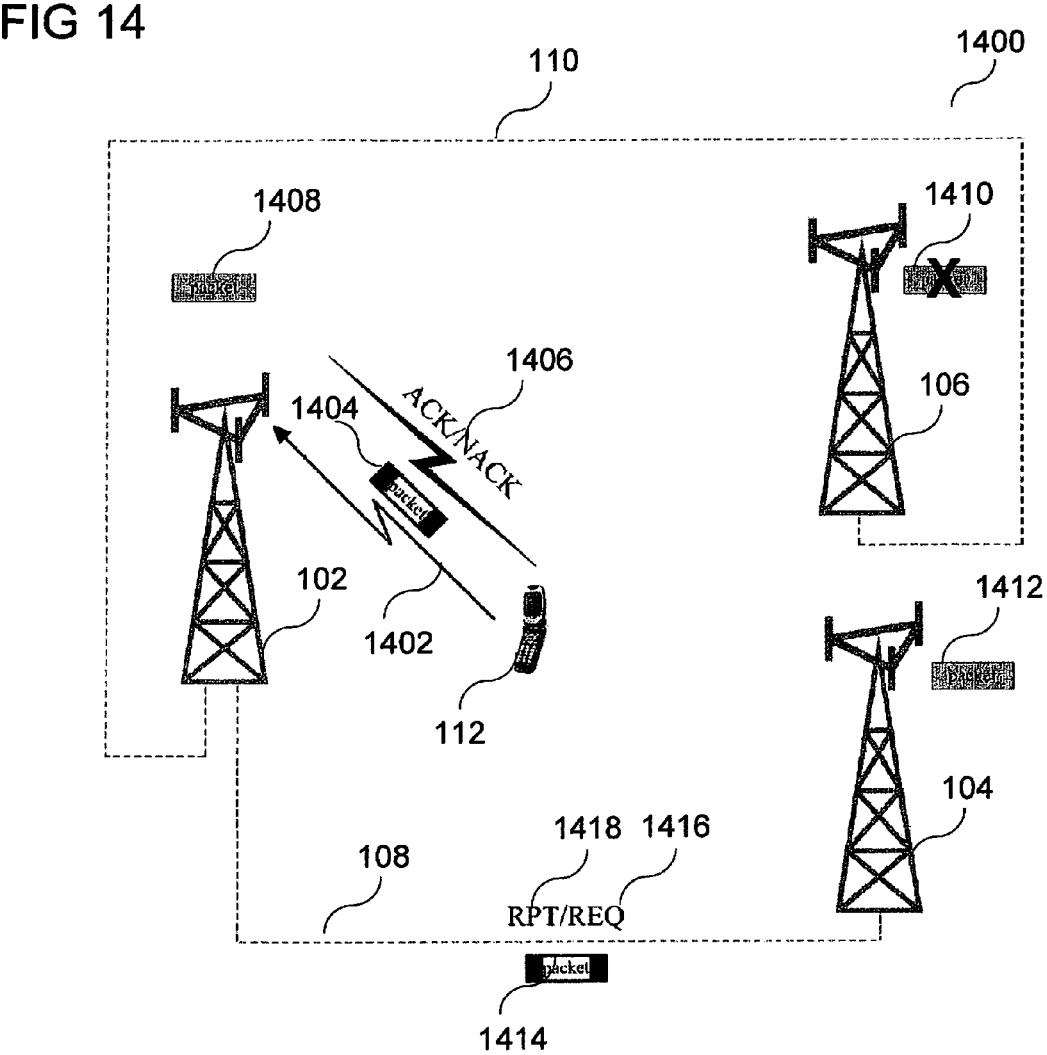
FIG. 14 shows a cellular communication system in accordance with an embodiment.

FIG. 14 shows a cellular communication system 1400 in accordance with an embodiment. Various components of the cellular communication system 1400 may be identical or similar to the components of the cellular communication system 100 described with reference to FIG. 1, and for these components, the same reference numerals may be used and duplicate description thereof may be omitted. It is to be noted that a first portion of the first time slot of the cellular communication system 1400 may be performed like described with reference to the cellular communication system 100 of FIG. 1 above, and that with reference to FIG. 14, processing according to various embodiments at the end of the first time slot may be described.

In the cellular communication system 1400, a fourth protocol may be applied. Contrary to the third protocol, the cooperative phase in the fourth protocol may be initiated by the collaborative eNode-Bs 104, 106. To relax the delay requirement for the backhaul in other protocols, the collaborative eNode-Bs 104, 106 in the fourth protocol may take more active roles by sending a report (RPT) message 1418 to the serving eNode-B 102 to indicate their availability for collaboration as illustrated in FIG. 14. As will be explained with more detail with reference to FIG. 15 below, the collaborative eNode-Bs who decode the packet successfully may transmit immediately a RPT message to the serving eNode-B 102 through their backhaul links, without waiting for any REQ message as in the third protocol. For example, the second collaborative BS 106 may have not properly received the packet 1410, as indicated by a crossed packet 1410. For example, the first collaborative BS 104 may have properly received the packet 1412, as indicated by a non-crossed packet 1412. The RPT message may indicate to the serving eNode-B that a collaborative eNode-B has successfully decoded the packet. At the same time, the serving eNode-B may also check if it can decode the packet correctly. If no error is detected in the received packet received at the serving eNode-B or at least one RPT message is received, the serving eNode-B may send an ACK 1406 to the UE immediately. Note that the serving eNode-B may desire to send a REQ message to the collaborative eNode-Bs when it relies on the collaborative eNode-Bs for the data packet. Otherwise, it may send a NACK message to the UE to request for packet 1404 retransmissions (as indicated by arrow 1402). For example, the serving BS 102 may perform CRC of the packet received from the radio communication terminal 112 and may determine that the packet has been properly received as indicated by non-crossed packet 1408. For example, the first collaborate BS 104 may perform CRC of the packet received from the radio communication terminal 112 and may determine that the packet has been properly received as indicated by non-crossed packet 1412. An important feature of the protocol may be that the base station may be enabled to send ACK to UE even before it receives the user data. This may be possible due to the reliable connection between base stations.

Figure 15:
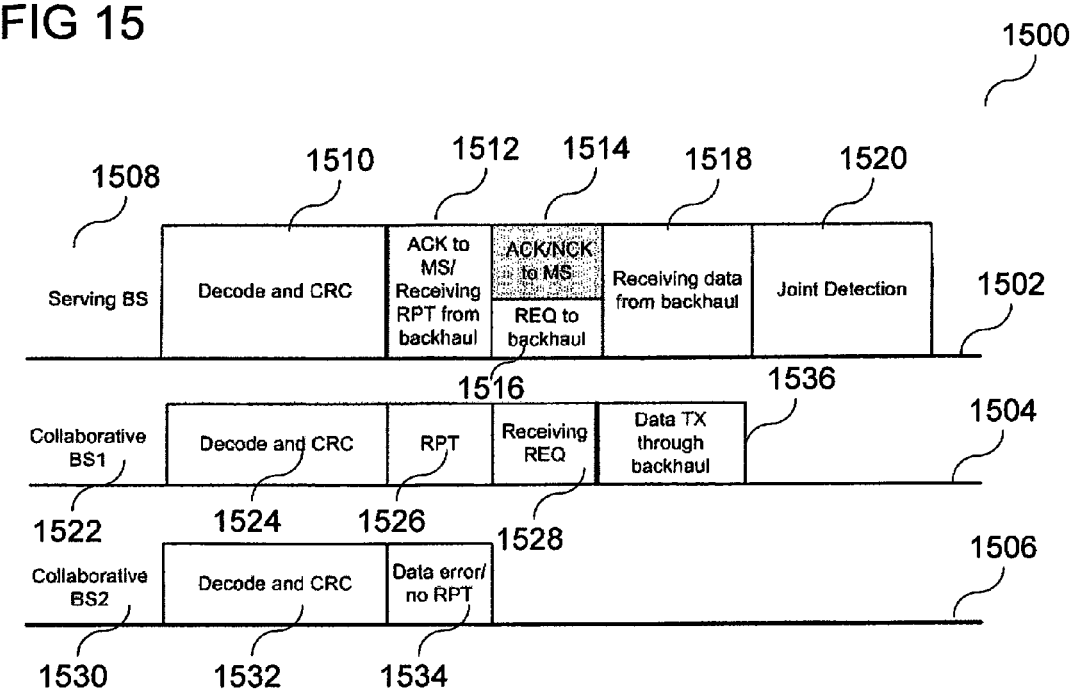
FIG. 15 shows an illustration of a method for controlling a cellular communication system in accordance with an embodiment.

FIG. 15 shows an illustration 1500 of a method for controlling a cellular communication system in accordance with an embodiment. Processing 1508 of the serving base station 102 is shown over a first time axis 1502. Processing 1522 of the first collaborative BS 104 is shown over a second time axis 1504. Processing 1530 of the second collaborative BS 106 is shown over a third time axis 1506. The first time axis 1502, the second time axis 1504 and the third time axis 1506 may be parallel or almost parallel, for example, processes shown at the same horizontal position may be performed at the same or with a small time difference similar to FIG. 13.

In 1510, the serving BS 102 may perform decoding and CRC of the packet received in the serving BS 102. In 1524, the first collaborative BS 104 may perform decoding and CRC of the packet received in the first collaborative BS 104. In 1532, the second collaborative BS 106 may perform decoding and CRC of the packet received in the second collaborative BS 106. In 1534, the second collaborative BS 106 may determine that it has not properly received the packet, as indicated by a crossed packet 1410 in FIG. 14, and the second collaborative BS 106 may thus determine not to send a report and may stop processing for the present time slot.

In 1526, the first collaborative BS 104 may send a RPT 1418 to the serving BS 102 using the first backhaul 108. In 1512, the serving BS 102 may send an ACK 1406 to the radio communication terminal 112 (for example a MS 112) if it determines from processing 1510 that the packet is properly received. Otherwise it may receive a report RPT 1418 from the first collaborative BS 104, indicating that the first collaborative BS 104 has properly received the packet.

In 1514, the serving BS 104 may send an ACK 1406 to the radio communication terminal 112, and, for example at the same time or after sending the ACK 1406, in 1516, the serving BS 104 may send a REQ 1416 to the first collaborative BS 104 using the first backhaul 108. In 1528, the first collaborative BS 104 may receive the REQ 1416. In 1536, the first collaborative BS 104 may transmit the packet data 1414 through the backhaul 110 to the serving BS 102. In 1518, the serving BS 102 may receive the packet data 1414 from the first collaborative BS 104 using the backhaul.

In 1520, the serving BS 102 may perform joint detection, for example, may determine, which packet of the packet received from the radio communication terminal 112 and the packet received from the first collaborative BS 104 may be used.

In various embodiments, the collaborative eNode-Bs may completely decode the received packets after the CRC check.

In various embodiments, the collaborative eNode-Bs may forward their received packets without performing any decoding. This may be useful for delay sensitive applications.

In various embodiments, the time interval between receiving UE data and sending out ACK/NACK by a serving eNode-B may be fixed in many wireless transmission standards, such as 3GPP (Third Generation Partnership Project) LTE. As the data package may be large, the latency caused by the data exchange between eNode-Bs may pose problems for CoMP unless high-bandwidth fiber links are deployed. Comparing with the second protocol and the third protocol, it may be seen that the serving eNode-B in the fourth protocol may be able to respond to UE with the ACK/NACK message much faster without the actual data package received. It may desire a time interval of receiving a minimal RPT message (at most a few bits) before it may send out ACK/NACK at the worst case. It may relax the latency requirement on backhaul or bandwidth significantly (as the time consuming or bandwidth hungry user-data transmission does not need to be received before sending ACK).

In various embodiments, the average PER for the above protocols may be derived. For ease of exposition, $N_t=1$ and $K=1$ may be used to compare the performance. For the first protocol, this may be equivalent to a traditional truncated ARQ and the corresponding PER conditioned on $\gamma_s$ may be given by $$\mathbb{P}\{e|\gamma_s\}=[PER(\gamma_s)]^2 \qquad (4)$$

where $PER(\gamma)$ may denote the PER for a given SNR $\gamma$ with error correction capability and may be well approximated as $$PER(\gamma) \approx \begin{cases} 1, & \text{if } 0 < \gamma < \gamma_p \\ a\exp(-g\gamma), & \text{if } \gamma \geq \gamma_p \end{cases} \qquad (5)$$

where the parameters $(a, g, \gamma_p)$ may be found by a least-squares fitting method. Therefore, the average PER of the first protocol in quasi-static fading channel may be given by $$P_e^{(I)} = \mathbb{E}\{\mathbb{P}\{\varepsilon|\gamma_s\}\} \qquad (6)$$

$$= 1 - \frac{2g\lambda_s}{1+2g\lambda_s}\exp\left(-\frac{\gamma_p}{\lambda_s}\right).$$

In various embodiments, the average PER of the third protocol may be derived. At the collaborative BS, the conditional PER may be given by $$\mathbb{P}\{e|\gamma_1\}=PER(\gamma_1) \qquad (7)$$

and the unconditional PER may be obtained by averaging (7) with respect to $\gamma_1$. Therefore, the average PER of the second protocol in quasi-static fading channel may be given by $$P_e^{(II)} = E\{\mathbb{P}\{e\,|\,\gamma_1\}\} \times P_e^{(I)} + (1 - E\{\mathbb{P}\{e\,|\,\gamma_1\}\}) \times P_e^{(I)} \times PER(\gamma_{b,1}^{(II)}) \quad (8)$$

$$= \left[1 - \frac{g\lambda_1}{1+g\lambda_1}\exp\left(-\frac{\gamma_p}{\lambda_1}\right)\right]\left[1 - \frac{2g\lambda_s}{1+2g\lambda_s}\exp\left(-\frac{\gamma_p}{\lambda_s}\right)\right] +$$

$$\frac{g\lambda_1}{1+g\lambda_1}\exp\left(-\frac{\gamma_p}{\lambda_1}\right)\left[1 - \frac{2g\lambda_s}{1+2g\lambda_s}\exp\left(-\frac{\gamma_p}{\lambda_s}\right)\right]$$

$$a\exp(-g\gamma_{b,1}).$$

It is to be noted that the average PER of the third protocol and the fourth protocol may be exactly equal to the second protocol.

According to various embodiments, a framework that may employ CoMP at multiple eNode-Bs for UL to improve coverage, system throughput, and cell-edge throughput for cellular systems, for example LTE-Advanced systems or 4G (fourth generation) systems, may be provided. In UL transmissions, according to various embodiments, the coordinated reception of the transmitted signals at multiple eNode-Bs, which may be geographically spaced apart, may be involved. According to various embodiments, a coordinated reception, wherein the processing between collaborative eNode-Bs may be completely transparent to the UE, and thus may involve minimal change in the physical-layer and MAC specifications of the UE to serving eNode-B link may be provided. In accordance with various embodiments, only minimal coordination may be desired between the collaborative eNode-Bs via backhaul links, and cooperative ARQ may be provided in an opportunistic manner.

In various embodiments, two or more packets each having an error, may be combined in a way to receive a packet free of errors.

In various embodiments, different protocols have been described with reference to ARQ. it should be understood by those skilled in the art that the different protocols can also be applied and adapted to other ARQ schemes. For example, the protocols can also be adapted easily to Hybrid ARQ (HARQ), where the transmitted user data may comprise forward error control codes (FEC). Apart from error detection capability as in ARQ, HARQ is also able to correct errors to certain extent. As long as the received data are correctable, they can be considered as received properly, instead of error free as in the cases of ARQ. Furthermore, the retransmitted packets may not be the same as that in earlier transmission. In addition, the packets received from different transmissions may be combined in order to improve the decoding of the user data.

It is to be noted that although with reference to the above figures, different protocols have been described with reference to different cellular communication systems, different protocols may also be present in the same cellular communication system. For example, the protocols may be switched according to the desire of the system. For example, different protocols may be applied to different radio communication terminals.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A base station comprising:
    a first determiner configured to determine whether user data has been received from a radio communication terminal by the base station;
    a second determiner configured to determine whether information from which it may be determined that the user data has been received from the radio communication terminal by another base station has been received from the other base station;
    a transmitter configured to transmit to the radio communication terminal information indicating whether at least one of the base station and the other base station has received the user data based on at least one of the result of the determination of the first determiner and the result of the determination of the second determiner;
    an information requester configured to transmit to the other base station a request for information;
    an information receiver configured to receive the information requested by the information requester;
    a user data requester configured to transmit to the other base station a request for transmission of the user data; and
    a user data receiver configured to receive the user data requested by the user data requester,
    wherein the information requester is further configured to transmit the request for information from which it may be determined whether the user data has been received from the radio communication terminal by the other base station in case the first determiner determines that the user data has not been received from the radio communication terminal by the base station.

2. The base station of claim 1,
    wherein the information from which it may be determined that the user data has been received from the radio communication terminal by another base station is a report message that does not include the user data.

3. The base station of claim 1,
    wherein the information from which it may be determined that the user data has been received from the radio communication terminal by another base station is the user data.

4. The base station of claim 1,
    wherein the transmitter is configured to transmit an acknowledgement message to the radio communication terminal, in case it is determined by the first determiner that the user data has been received from the radio communication terminal by the base station.

5. The base station of claim 1,
    wherein the transmitter is configured to transmit an acknowledgement message to the radio communication terminal, in case it is determined by the second determiner that information from which it may be determined that the user data has been received from the radio communication terminal by the other base station has been received from the other base station.

6. The base station of claim 1,
    wherein the transmitter is configured to transmit a negative acknowledgement message to the radio communication terminal, in case it is determined by the first determiner that the user data has not been received from the radio communication terminal by the base station and it is determined by the second determiner that information from which it may be determined that the user data has been received from the radio communication terminal by the other base station has not been received from the other base station.

7. The base station of claim 1,
wherein the transmitter is configured to transmit a negative acknowledgement message to the radio communication terminal, in case it is not determined by the first determiner that the user data has been received from the radio communication terminal by the base station for a predetermined time and it is not determined by the second determiner that information from which it may be determined that the user data has been received from the radio communication terminal by the other base station has been received from the other base station for a predetermined time.

8. The base station of claim 1,
wherein the base station is a serving base station for the radio communication terminal.

9. The base station of claim 1, further comprising:
a radio transceiver configured to wirelessly communicate with the radio communication terminal.

10. A base station comprising:
a determiner configured to determine whether user data has been received from a radio communication terminal by the base station;
an information transmitter configured to transmit information from which it may be determined that the user data has been received from the radio communication terminal by the base station to another base station;
an information request receiver configured to receive from the other base station a request for information;
a user data request receiver configured to receive from the other base station a request for transmission of the user data; and
a user data transmitter configured to transmit to the other base station the user data requested from the user data request receiver;
wherein the information transmitter is further configured to transmit to the other base station the information requested from the information request receiver; and
wherein the base station is a non-serving base station for the radio communication terminal.

11. The base station of claim 10,
wherein the information from which it may be determined that the user data has been received from the radio communication terminal by the base station is a report message that does not include the user data.

12. The base station of claim 10,
wherein the information from which it may be determined that the user data has been received from the radio communication terminal by the base station is the user data.

13. The base station of claim 10, further comprising:
a radio receiver configured to wirelessly receive from the radio communication terminal.

14. A cellular communication system comprising:
a first base station and a second base station,
wherein the first base station is the base station of claim 1; and
wherein the second base station is the base station of claim 10.

* * * * *